United States Patent
Yang et al.

(10) Patent No.: US 9,509,895 B2
(45) Date of Patent: Nov. 29, 2016

(54) PAN-TILT-ZOOM DEVICE IDENTIFICATION METHOD, PAN-TILT-ZOOM DEVICE, CAMERA, AND PAN-TILT-ZOOM DEVICE CONTROL SYSTEM

(71) Applicant: Huawei Technologies Co., Ltd., Shenzhen (CN)

(72) Inventors: Zhiquan Yang, Hangzhou (CN); Yongjin Cai, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/580,868

(22) Filed: Dec. 23, 2014

(65) Prior Publication Data
US 2015/0109470 A1    Apr. 23, 2015

Related U.S. Application Data

(63) Continuation of application No. PCT/CN2013/078849, filed on Jul. 5, 2013.

(30) Foreign Application Priority Data

Jul. 5, 2012    (CN) .......................... 2012 1 0231543

(51) Int. Cl.
*H04N 5/232*    (2006.01)
*H04N 5/225*    (2006.01)
(Continued)

(52) U.S. Cl.
CPC .......... *H04N 5/23209* (2013.01); *G05B 15/02* (2013.01); *H04L 29/06* (2013.01); *H04N 5/222* (2013.01); *H04N 5/225* (2013.01); *H04N 5/23203* (2013.01)

(58) Field of Classification Search
CPC ..................... H04N 5/23209; H04N 5/23203; H04N 5/232; H04N 5/222; H04L 29/06
See application file for complete search history.

(56) References Cited

U.S. PATENT DOCUMENTS

| | | | |
|---|---|---|---|
| 6,717,612 B1 | 4/2004 | Matsumura | |
| 2004/0042783 A1* | 3/2004 | Diana | F16M 11/10 |
| | | | 396/427 |

(Continued)

FOREIGN PATENT DOCUMENTS

| | | |
|---|---|---|
| CN | 1913533 A | 2/2007 |
| CN | 1976401 A | 6/2007 |

(Continued)

OTHER PUBLICATIONS

Partial English Translation and Abstract of Chinese Patent Application No. CN102789187A, Part 1, Feb. 2, 2015, 6 pages.

(Continued)

*Primary Examiner* — Abdelaaziz Tissire
(74) *Attorney, Agent, or Firm* — Conley Rose, P.C.

(57) ABSTRACT

A pan-tilt-zoom device identification method, a pan-tilt-zoom device, a camera, and a pan-tilt-zoom device control system are provided. The corresponding method includes, when a pan-tilt-zoom device finds that a device connects to a predetermined interface, sending a keep-alive command to the connecting device, where the keep-alive command includes pan-tilt-zoom device capability information carrying a control function of the pan-tilt-zoom device; and determining, by the connecting device, the control function of the pan-tilt-zoom device according to the keep-alive command, and reporting control capability information of the pan-tilt-zoom device.

13 Claims, 5 Drawing Sheets

(51) Int. Cl.
*H04L 29/06* (2006.01)
*H04N 5/222* (2006.01)
*G05B 15/02* (2006.01)

(56) References Cited

U.S. PATENT DOCUMENTS

| | | | |
|---|---|---|---|
| 2004/0186694 A1 | 9/2004 | Oya | |
| 2006/0279628 A1* | 12/2006 | Fleming | G11B 27/034 348/143 |
| 2007/0126883 A1 | 6/2007 | Ishige et al. | |
| 2011/0058036 A1* | 3/2011 | Metzger | H04N 7/181 348/143 |
| 2012/0229638 A1* | 9/2012 | Liu | H04N 5/232 348/143 |
| 2014/0092262 A1* | 4/2014 | Otsuka | H04N 5/23206 348/207.1 |

FOREIGN PATENT DOCUMENTS

| | | | |
|---|---|---|---|
| CN | 101127893 A | 2/2008 |
| CN | 101184063 A | 5/2008 |
| CN | 101325689 A | 12/2008 |
| CN | 101562730 A | 10/2009 |
| CN | 101605249 A | 12/2009 |
| CN | 201742474 U | 2/2011 |
| CN | 102377979 A | 3/2012 |
| CN | 102789187 A | 11/2012 |
| JP | 20040208235 A | 7/2004 |
| JP | 20040220214 A | 8/2004 |
| JP | 2006115091 A | 4/2006 |
| JP | 2007034713 A | 2/2007 |
| JP | 2008167047 A | 7/2008 |
| JP | 2010109733 A | 5/2010 |
| WO | 9728645 A1 | 8/1997 |
| WO | 2006048613 A1 | 5/2006 |

OTHER PUBLICATIONS

Partial English Translation and Abstract of Chinese Patent Application No. CN102789187A, Part 2, Feb. 2, 2015, 3 pages.
Foreign Communication From A Counterpart Application, Chinese Application No. 201210231543.5, Chinese Office Action dated Jan. 30, 2014, 7 pages.
Foreign Communication From A Counterpart Application, PCT Application No. PCT/CN2013/078849, English Translation of International Search Report dated Oct. 17, 2013, 3 pages.
Foreign Communication From A Counterpart Application, PCT Application No. PCT/CN2013/078849, English Translation of Written Opinion dated Oct. 17, 2013, 9 pages.
Foreign Communication From A Counterpart Application, European Application No. 13813067.9, Extended European Search Report dated Apr. 30, 2015, 5 pages.
Partial English Translation and Abstract of Japanese Patent Application No. JP2004208235, Part 1, Apr. 8, 2016, 4 pages.
Partial English Translation and Abstract of Japanese Patent Application No. JP2004208235, Part 2, Apr. 8, 2016, 10 pages.
Partial English Translation and Abstract of Japanese Patent Application No. JP2006115091, Part 1, Apr. 8, 2016, 3 pages.
Partial English Translation and Abstract of Japanese Patent Application No. JP2006115091, Part 2, Apr. 8, 2016, 6 pages.
Partial English Translation and Abstract of Japanese Patent Application No. JP2008167047, Part 1, Apr. 8, 2016, 3 pages.
Partial English Translation and Abstract of Japanese Patent Application No. JP2008167047, Part 2, Apr. 8, 2016, 12 pages.
Partial English Translation and Abstract of Japanese Patent Application No. JP2010109733, Part 1, Apr. 8, 2016, 3 pages.
Partial English Translation and Abstract of Japanese Patent Application No. JP2010109733, Part 2, Apr. 8, 2016, 7 pages.
Foreign Communication From A Counterpart Application, Chinese Application No. 2015-518825, Chinese Office Action dated Jan. 19, 2016, 3 pages.
Foreign Communication From A Counterpart Application, Chinese Application No. 2015-518825, English Translation of Chinese Office Action dated Jan. 19, 2016, 4 pages.
Partial English Translation and Abstract of Japanese Patent Application No. JPA2004220214, Jul. 6, 2016, 61 pages.
Partial English Translation and Abstract of Japanese Patent Application No. JPA200734713, Jul. 6, 2016, 59 pages.
Foreign Communication From A Counterpart Application, Japanese Application No. 2015-518825, Japanese Decision of Rejection dated Jun. 14, 2016, 2 pages.
Foreign Communication From A Counterpart Application, Japanese Application No. 2015-518825, English Translation of Japanese Decision of Rejection dated Jun. 14, 2016, 3 pages.

\* cited by examiner

PAN-TILT-ZOOM DEVICE IDENTIFICATION METHOD, PAN-TILT-ZOOM DEVICE, CAMERA, AND PAN-TILT-ZOOM DEVICE CONTROL SYSTEM

CROSS-REFERENCE TO RELATED APPLICATIONS

This application is a continuation of International Application No. PCT/CN2013/078849, filed on Jul. 5, 2013, which claims priority to Chinese Patent Application No. 201210231543.5, filed on Jul. 5, 2012, both of which are hereby incorporated by reference in their entireties.

TECHNICAL FIELD

The present invention belongs to the field of camera device control technologies, and relates to a pan-tilt-zoom device identification method, a pan-tilt-zoom device, a camera, and a pan-tilt-zoom device control system.

BACKGROUND

In a video monitoring field, cameras are widely applied. In a routine monitoring project, there are a large number of cameras, especially gun type cameras. A box camera is usually disposed in a fixed manner, and if the box camera needs to rotate, a pan-tilt-zoom device is usually added and configured to assist the box camera in rotating. However, a management platform or a box camera cannot automatically sense whether a pan-tilt-zoom device is configured for the camera. In the prior art, generally, a pan-tilt-zoom device is manually configured for a camera. In a case that maintenance personnel knows that the camera is configured with the pan-tilt-zoom device, the maintenance personnel configure a management platform. The management platform can control the camera and the pan-tilt-zoom device only after the pan-tilt-zoom device is configured.

If control of the camera or the pan-tilt-zoom device is abnormal, the management platform cannot automatically sense a cause. In order that the camera and the pan-tilt-zoom device can be normally used, the only method is as follows: maintenance and construction personnel need to go to a device installation site, learn, by troubleshooting, whether the cause results from a fault in the camera or the pan-tilt-zoom device, and make a repair, thereby resulting in that a workload of the maintenance and construction personnel is heavy and working difficulty is great. In addition, an error occurs easily, and maintenance real-time performance is poor.

SUMMARY

Embodiments of the present invention provide a pan-tilt-zoom device identification method, a pan-tilt-zoom device, a camera, and a pan-tilt-zoom device control system, which is convenient for a management platform and a camera to find a configuration problem by using capabilities of the management platform and the camera, thereby reducing a workload, lowering an error probability, and improving maintenance real-time performance.

An embodiment of the present invention provides a pan-tilt-zoom device identification method, including: when a pan-tilt-zoom device finds that a device connects to a predetermined interface, sending a keep-alive command to the connecting device, where the keep-alive command includes pan-tilt-zoom device capability information carrying a control function of the pan-tilt-zoom device; and determining, by the connecting device, the control function of the pan-tilt-zoom device according to the keep-alive command, and reporting control capability information of the pan-tilt-zoom device.

An embodiment of the present invention further provides a pan-tilt-zoom device, including an installation platform, a rotating motor, and a rotation control module, where both the rotating motor and the rotation control module are disposed on the installation platform, and a control signal output end of the rotation control module is connected to a control signal input end of the rotating motor; and the pan-tilt-zoom device further includes a keep-alive command sending module configured to, when it is found that a device connects to a predetermined interface, send a keep-alive command to the connecting device, where the keep-alive command includes pan-tilt-zoom device capability information.

An embodiment of the present invention further provides a camera, including a lens, a sensor, a coding processor, and a main controller, where image signal output ends of the lens and the sensor are connected to an image signal input end of the coding processor, an image signal output end of the coding processor is connected to an image signal input end of the main controller, and a control signal output end of the main controller is connected to a control signal input end of the coding processor; and the camera further includes an identifying module configured to determine a control function of a pan-tilt-zoom device according to a keep-alive command, where the keep-alive command includes pan-tilt-zoom device capability information; and a device connection reporting module configured to report control capability information of the pan-tilt-zoom device.

It can be seen from the foregoing technical solutions provided in the embodiments of the present invention that, a camera determines, according to a keep-alive command, that a pan-tilt-zoom device connects to the camera and whether the pan-tilt-zoom device is available, and an information exchange procedure for notifying that the pan-tilt-zoom device connects to the camera is added for the camera and a management platform, which is convenient for the management platform and the camera to find a configuration problem by using capabilities of the management platform and the camera, thereby reducing a workload, lowering an error probability, and improving maintenance real-time performance.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
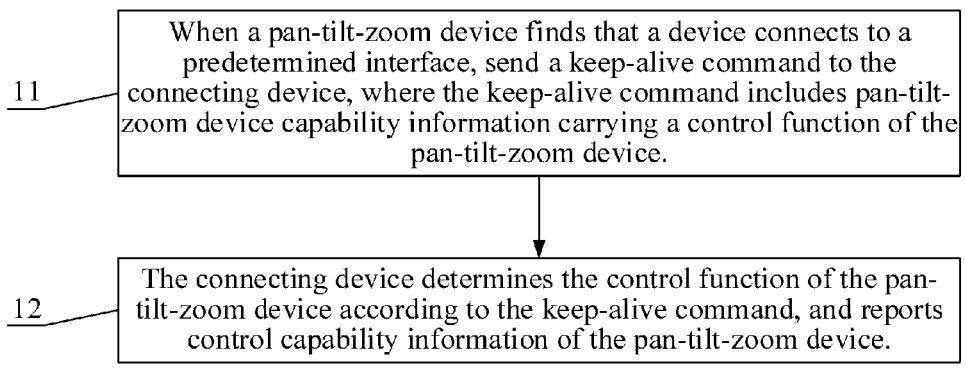
FIG. 1 is a schematic flowchart of a pan-tilt-zoom device identification method according to an embodiment of the present invention.

After an existing pan-tilt-zoom device completes a connection to a camera, in a later using process of a user, if a disconnection between the camera and the pan-tilt-zoom device occurs, the user cannot obtain a corresponding alarm notification, and a function failure of the pan-tilt-zoom device is caused. To solve this problem, in an embodiment, it is determined that a camera has already connected to a pan-tilt-zoom device by using a method in which the camera is configured to automatically sense the pan-tilt-zoom device after the pan-tilt-zoom device connects to the camera, thereby reducing a workload, lowering an error probability, and improving maintenance real-time performance. In view of this, an embodiment provides a pan-tilt-zoom device identification method. As shown in FIG. 1, the method includes the following steps.

Step 11: When a pan-tilt-zoom device finds that a device connects to a predetermined interface, send a keep-alive command to the connecting device, where the keep-alive command includes pan-tilt-zoom device capability information carrying a control function of the pan-tilt-zoom device.

The corresponding connecting device may be a camera, a temperature and humidity detector, an infrared detector, or the like. Because an existing pan-tilt-zoom device does not have an automatic identification function, in order that the connecting device can identify a connecting pan-tilt-zoom device, in this embodiment, according to a fact that serial ports of both a connecting device and a pan-tilt-zoom device have an insertion detection function, a communication protocol for mutual automatic identification is defined between the connecting device and the pan-tilt-zoom device. In a case in which it is ensured that parameters (such as baud rates, data bits, parity bits, and stop bits) of serial ports between the two devices are the same, the pan-tilt-zoom device can automatically find that the camera or another device connects to the pan-tilt-zoom device through a serial port. The communication protocol may be that when a pan-tilt-zoom device detects that a device connects to a serial port, the pan-tilt-zoom device sends a keep-alive command to the connecting device, where the corresponding keep-alive command includes pan-tilt-zoom device capability information carrying a control function of the pan-tilt-zoom device, so that the connecting device can learn what control function the pan-tilt-zoom device has.

Further, after the keep-alive command is sent for the first time, the keep-alive command may be sent to the connecting device again at any reasonable time intervals such as every 30 seconds, 1 minute, or 5 minutes, so as to ensure that the connecting device can successively receive the keep-alive command, so that the connecting device can confirm availability of the pan-tilt-zoom device.

Step 12: The connecting device determines the control function of the pan-tilt-zoom device according to the keep-alive command, and reports control capability information of the pan-tilt-zoom device.

After the connecting device receives the keep-alive command sent by the pan-tilt-zoom device, the connecting device can determine that a device currently connecting to the connecting device is a pan-tilt-zoom device and the pan-tilt-zoom device is available, determines, according to the corresponding keep-alive command, a control function of the connecting pan-tilt-zoom device, and adds an identifier indicating that the connecting device has already connected to the pan-tilt-zoom device. When needing to control the pan-tilt-zoom device, the connecting device may send a pan-tilt-zoom control command to the pan-tilt-zoom device, where the corresponding pan-tilt-zoom control command includes control capability information of the corresponding pan-tilt-zoom device that is reported by the connecting device to an upper management platform after the connecting device determines that the connecting pan-tilt-zoom device is available and if the connecting device has already registered with the upper management platform, so that the upper management platform performs corresponding control on the corresponding pan-tilt-zoom device.

Further, if the connecting device does not receive the keep-alive command after any reasonable time interval such as every 30 seconds, 1 minute, or 5 minutes, the connecting device determines that the pan-tilt-zoom device is faulty, and reports fault information of the pan-tilt-zoom device to the management platform.

Figure 2:
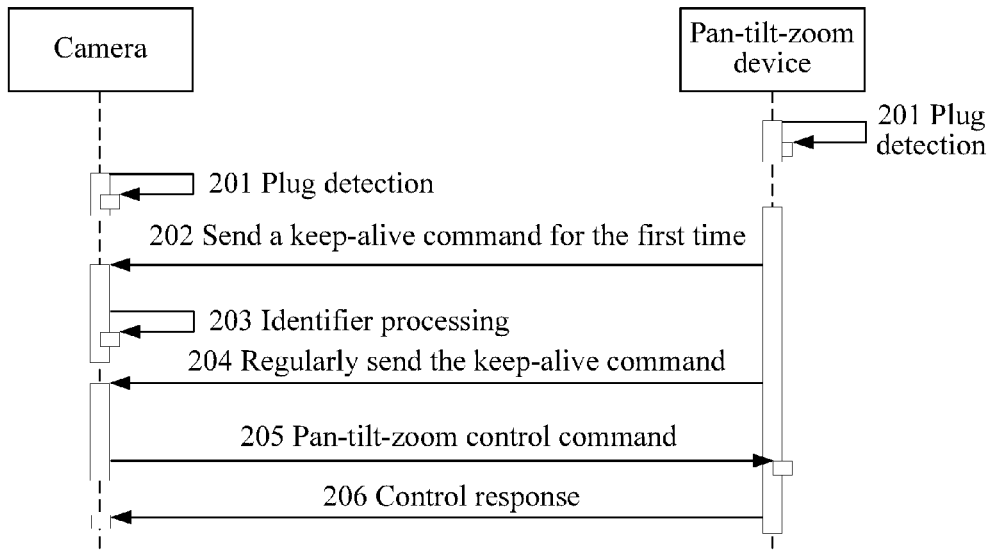
FIG. 2 is a schematic diagram of a procedure of interaction between a camera and a pan-tilt-zoom device according to an embodiment of the present invention.

The following uses a camera as an example of the connecting device to describe a pan-tilt-zoom device identification method in detail, where the camera is configured to obtain a real-time audio/video signal. A procedure of interaction between a camera and a pan-tilt-zoom device is shown in FIG. 2 and may include the following steps.

Figure 3:
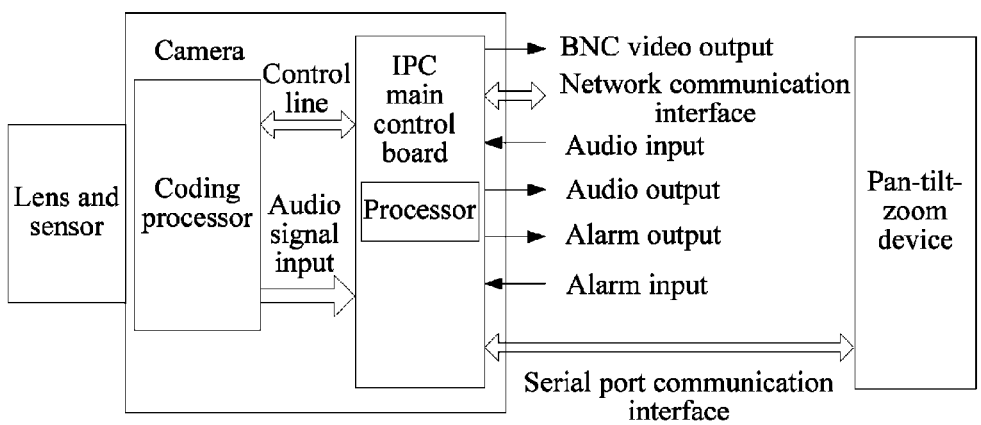
FIG. 3 is a schematic diagram of a connection logic structure of a camera and a pan-tilt-zoom device according to an embodiment of the present invention.

Step 201: Communication interfaces of both a camera and a pan-tilt-zoom device have an automatic plug detection function, and can automatically sense a device once the device connects to the communication interfaces. A connection logic structure of the camera and the pan-tilt-zoom device is shown in FIG. 3. The camera includes components such as a lens, a sensor, a coding processor, and a main controller, where the main controller may be an Inter-Process Communication (IPC) main control board, and is configured to control the coding processor by using a control line. The coding processor inputs an image, which is collected by the lens and the sensor, in the form of a video signal to the IPC main control board. The IPC main control board has functions such as Bayonet Nut Connector (BNC)

video output, a network communication interface, audio input, audio output, alarm output, alarm input, and a serial port communication interface, and a processor of the IPC main control board is connected to the pan-tilt-zoom device through the serial port communication interface. In a case in which it is ensured that parameters (such as baud rates, data bits, parity bits, and stop bits) of serial ports between the two devices are the same, the pan-tilt-zoom device can automatically find that the camera or another device connects to the pan-tilt-zoom device through a serial port.

Step 202: After the camera and the pan-tilt-zoom device senses each other in a plug-in manner for the first time, the pan-tilt-zoom device sends a first keep-alive command to the camera, where the corresponding keep-alive command includes information such as a control capability of the pan-tilt-zoom device.

Step 203: The camera parses the first keep-alive command sent by the pan-tilt-zoom device, and adds, after determining that the pan-tilt-zoom device connects to the camera, an identifier indicating a capability of the camera, that is, adds an identifier indicating that the camera can use the control capability of the pan-tilt-zoom device according to the keep-alive command.

Step 204: The pan-tilt-zoom device regularly sends the keep-alive command, which can ensure reliability of communication between the camera and the pan-tilt-zoom device; the camera regularly receives the keep-alive command sent by the pan-tilt-zoom device; when the camera finds that the camera does not receive, for a predetermined number of times, the keep-alive command sent by the pan-tilt-zoom device, the camera considers that the pan-tilt-zoom device connected to the camera is faulty or the camera does not support pan-tilt-zoom control, and adds an identifier indicating that the camera is a camera which cannot use pan-tilt-zoom control; and if the camera registers with an upper management platform, the camera sends an alarm notification to the management platform, where content of the notification is that a type of the camera changes, that is, the camera does not support a pan-tilt-zoom control function.

Steps 205 to 206: The camera normally uses an interaction procedure of controlling the pan-tilt-zoom device, where a pan-tilt-zoom control command includes rotation direction control, windshield wiper control, lighting control, and the like.

According to the technical solution of this embodiment, a camera determines, according to a keep-alive command, that a pan-tilt-zoom device connects to the camera, and an information exchange procedure for notifying that the pan-tilt-zoom device connects to the camera is added for the camera and a management platform, which is convenient for the management platform and the camera to find a configuration problem by using capabilities of the management platform and the camera, thereby reducing a workload, lowering an error probability, and improving maintenance real-time performance.

Figure 4:
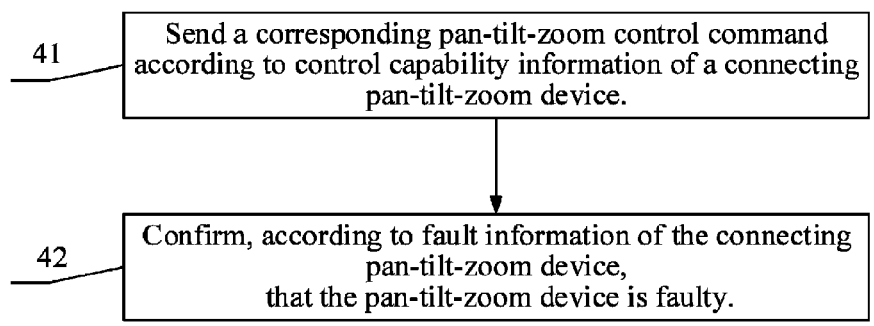
FIG. 4 is a schematic flowchart of a pan-tilt-zoom device control method according to an embodiment of the present invention.

An embodiment of the present invention further provides a pan-tilt-zoom device control method. As shown in FIG. 4, the method includes the following steps.

Step 41: Send a corresponding pan-tilt-zoom control command according to control capability information of a connecting pan-tilt-zoom device.

In this embodiment, a procedure protocol of camera type automatic sensing and a type change alarm is newly added for interaction between a camera and a management platform. After the camera and the pan-tilt-zoom device are powered on, the camera confirms, according to a keep-alive command, that the pan-tilt-zoom device is available. Then the camera submits a registration application to the management platform, and provides the management platform with the control capability information of the pan-tilt-zoom device. The management platform responds to the registration application of the camera and adds an identifier indicating a control type of the camera, that is, the management platform can control the pan-tilt-zoom device by using the camera. After a client sends a camera pan-tilt-zoom control request to the management platform, the management platform sends a corresponding pan-tilt-zoom control command to the pan-tilt-zoom device, where the pan-tilt-zoom control command includes rotation direction control, windshield wiper control, lighting control, and the like. After normally controlling the pan-tilt-zoom device through interaction, the camera returns a response to the management platform, so as to complete an interaction process.

Step 42: Confirm, according to fault information of the connecting pan-tilt-zoom device, that the pan-tilt-zoom device is faulty.

If communication between the camera and the pan-tilt-zoom device becomes abnormal for a plurality of times, that is, the camera does not receive, after a predetermined period of time, the keep-alive command sent by the pan-tilt-zoom device, the camera considers that the pan-tilt-zoom device is faulty and sends fault information of the connecting pan-tilt-zoom device to the management platform. The management platform confirms that the pan-tilt-zoom device is faulty and performs identifier processing on the camera, that is, adds an identifier indicating that the camera loses a pan-tilt-zoom control capability and becomes an ordinary fixed camera; and the management platform reports a notification to a monitoring client, and a user can find, by using the monitoring client in time, that the camera and the pan-tilt-zoom device are abnormal.

According to the technical solution of this embodiment, a camera determines, according to a keep-alive command, that a pan-tilt-zoom device connects to the camera and whether the pan-tilt-zoom device is available, and an information exchange procedure for notifying that the pan-tilt-zoom device connects to the camera is added for the camera and a management platform, which is convenient for the management platform and the camera to find a configuration problem by using capabilities of the management platform and the camera, thereby reducing a workload, lowering an error probability, and improving maintenance real-time performance.

It should be noted that a person of ordinary skill in the art may understand that all or a part of the steps of the foregoing method embodiments may be implemented by a program instructing relevant hardware. The corresponding program may be stored in a computer readable storage medium. The foregoing storage medium may be a read-only memory, a magnetic disk, an optical disc, or the like.

Figure 5:
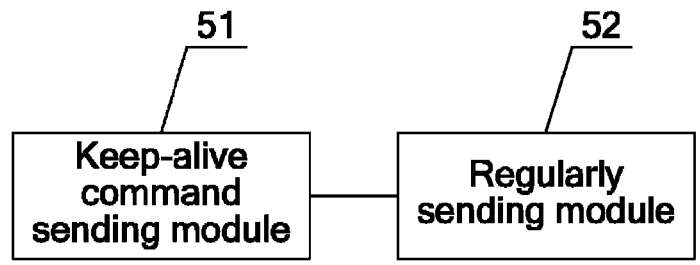
FIG. 5 is a schematic structural diagram of a pan-tilt-zoom device according to an embodiment of the present invention.

An embodiment of the present invention further provides a pan-tilt-zoom device, including components such as an installation platform, a rotating motor, and a rotation control module, where both the rotating motor and the rotation control module are disposed on the installation platform, and a control signal output end of the rotation control module is connected to a control signal input end of the rotating motor. As shown in FIG. 5, the pan-tilt-zoom device further includes a keep-alive command sending module 51 configured to, when it is found that a device connects to a predetermined interface, send a keep-alive command to the connecting device, where the keep-alive command includes pan-tilt-zoom device capability information.

Optionally, the pan-tilt-zoom device may further include a regular sending module 52 configured to send the keep-alive command to the connecting device after a predetermined time interval.

Figure 6:
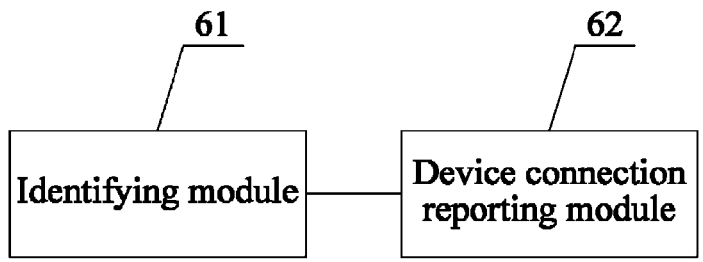
FIG. 6 is a schematic structural diagram of a camera according to an embodiment of the present invention.

An embodiment of the present invention further provides a camera, including a lens, a sensor, a coding processor, and a main controller, where image signal output ends of the lens and the sensor are connected to an image signal input end of the coding processor, an image signal output end of the coding processor is connected to an image signal input end of the main controller, and a control signal output end of the main controller is connected to a control signal input end of the coding processor. As shown in FIG. 6, the camera further includes an identifying module 61 configured to determine a control function of a pan-tilt-zoom device according to the keep-alive command, where the keep-alive command includes pan-tilt-zoom device capability information; and a device connection reporting module 62 configured to report control capability information of the connecting pan-tilt-zoom device.

Figure 7:
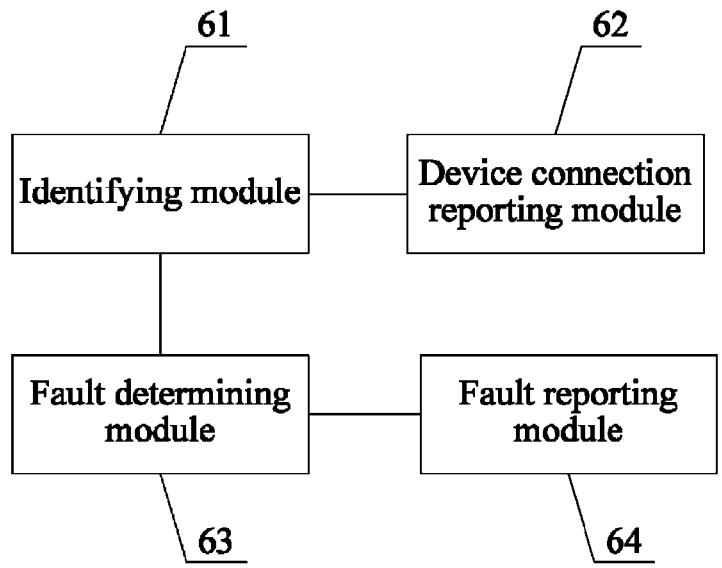
FIG. 7 is a schematic structural diagram of a camera in which a fault determining module and a fault reporting module are added according to an embodiment of the present invention.

Optionally, as shown in FIG. 7, the camera may further include a fault determining module 63 configured to, if the keep-alive command is not received after a predetermined time interval, determine that the connecting pan-tilt-zoom device is faulty; and a fault reporting module 64 configured to report fault information of the connecting pan-tilt-zoom device.

Figure 8:
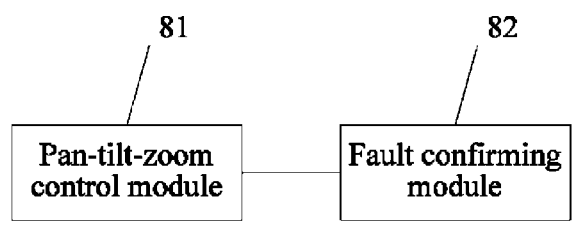
FIG. 8 is a schematic structural diagram of a pan-tilt-zoom device control apparatus according to an embodiment of the present invention.

An embodiment of the present invention further provides a pan-tilt-zoom device control apparatus. As shown in FIG. 8, the apparatus includes a pan-tilt-zoom control module 81 configured to send a corresponding pan-tilt-zoom control command according to control capability information of a connecting pan-tilt-zoom device; and a fault confirming module 82 configured to confirm, according to fault information of the connecting pan-tilt-zoom device, that the pan-tilt-zoom device is faulty.

Specific implementation manners for processing functions of the modules in the foregoing pan-tilt-zoom device, camera, and pan-tilt-zoom device control apparatus are described in the foregoing method embodiments, which are not described repeatedly herein.

According to the technical solution of this embodiment, a camera determines, according to a keep-alive command, that a pan-tilt-zoom device connects to the camera and whether the pan-tilt-zoom device is available, and an information exchange procedure for notifying that the pan-tilt-zoom device connects to the camera is added for the camera and a management platform, which is convenient for the management platform and the camera to find a configuration problem by using capabilities of the management platform and the camera, thereby reducing a workload, lowering an error probability, and improving maintenance real-time performance.

It should be noted that in the foregoing terminal embodiments, the included units are classified only according to functional logic, but are not limited to the foregoing classification as long as the units can implement corresponding functions; in addition, specific names of the functional units are only intended to facilitate distinction between the modules, rather than to limit the protection scope of the present invention. In addition, for technical details not related in the terminal embodiment due to limited space, refer to the method embodiments.

Figure 9:
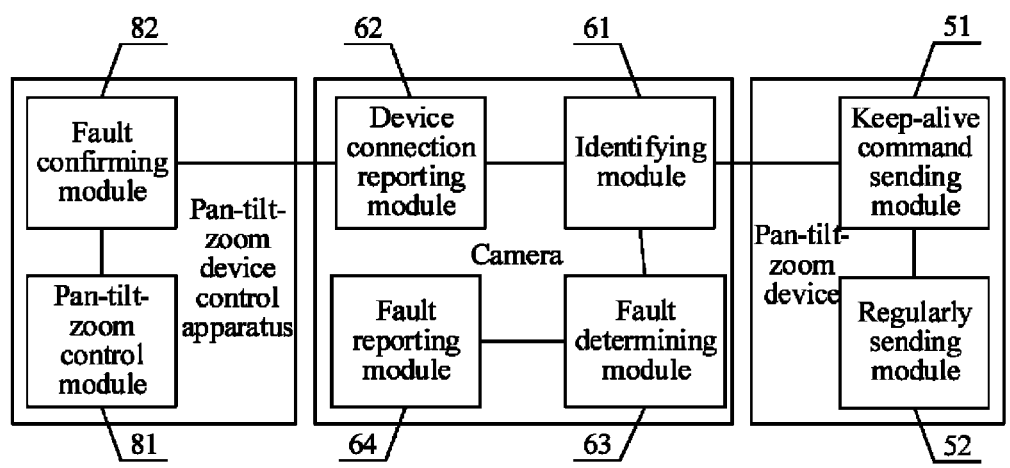
FIG. 9 is a schematic structural diagram of a pan-tilt-zoom device control system according to an embodiment of the present invention.

An embodiment of the present invention further provides a pan-tilt-zoom device control system. As shown in FIG. 9, the system includes a pan-tilt-zoom device, a camera, and a pan-tilt-zoom control apparatus, where the pan-tilt-zoom device includes a keep-alive command sending module 51 configured to, when it is found that a device connects to a predetermined interface, send a keep-alive command to the connecting device, where the keep-alive command includes pan-tilt-zoom device capability information; and a regularly sending module 52 configured to send the keep-alive command to the connecting device after a predetermined time interval; the camera includes an identifying module 61 configured to determine a control function of the connecting pan-tilt-zoom device according to the keep-alive command, where the keep-alive command includes the pan-tilt-zoom device capability information; a device connection reporting module 62 configured to report control capability information of the connecting pan-tilt-zoom device; a fault determining module 63 configured to: if the keep-alive command is not received after a predetermined time interval, determine that the connecting pan-tilt-zoom device is faulty; and a fault reporting module 64 configured to report fault information of the connecting pan-tilt-zoom device; and the pan-tilt-zoom device control apparatus includes: a pan-tilt-zoom control module 81 configured to send a corresponding pan-tilt-zoom control command according to the control capability information of the connecting pan-tilt-zoom device; and a fault confirming module 82 configured to confirm, according to the fault information of the connecting pan-tilt-zoom device, that the pan-tilt-zoom device is faulty.

Compared with an existing solution, in the pan-tilt-zoom device control system provided in this embodiment, a procedure protocol of camera type automatic sensing and a type change alarm is newly added for interaction between a camera and a management platform. When a user configures or maintains the camera, the user does not need to know a type of the configured camera in advance, and the camera automatically senses a capability of a pan-tilt-zoom device and sends a notification to the management platform. In a process that the user uses the camera, if the camera loses contact with the pan-tilt-zoom device, that is, the camera cannot receive an interaction command of the pan-tilt-zoom device for a plurality of times, the camera sends an alarm notification to a monitoring client of the management platform in time; and the user senses, in time according to fault information of the connecting pan-tilt-zoom device, that camera pan-tilt-zoom control is abnormal, and performs maintenance processing in time.

Figure 10:
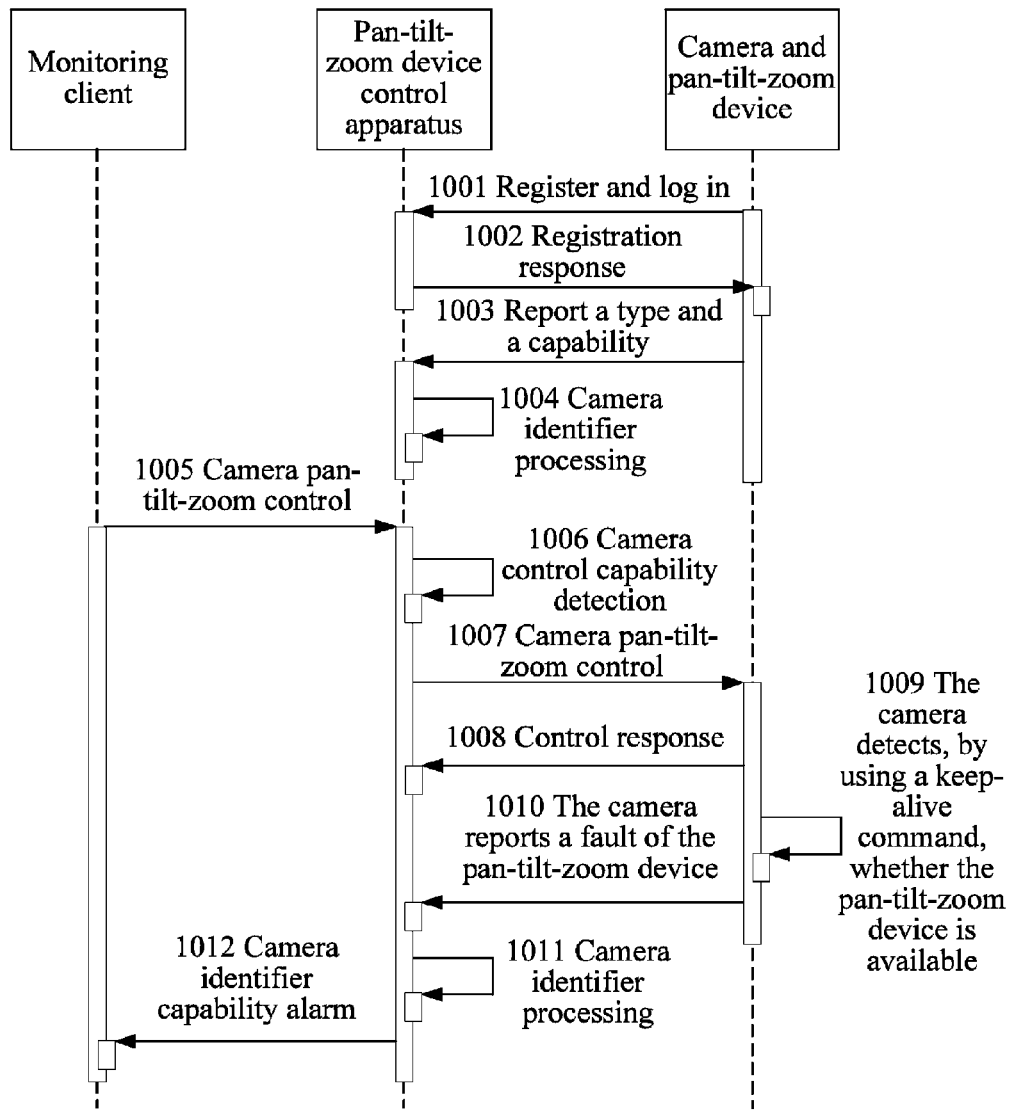
FIG. 10 is a schematic diagram of a procedure of interaction among a camera, a pan-tilt-zoom device, and a pan-tilt-zoom device control apparatus according to an embodiment of the present invention.

The following uses a pan-tilt-zoom device control apparatus as an example of a management platform to describe a pan-tilt-zoom device control system in detail. A procedure of interaction among a camera, a pan-tilt-zoom device, and a pan-tilt-zoom device control apparatus is shown in FIG. 10, which may include the following steps.

Step 1001: After the camera and the pan-tilt-zoom device are powered on, the camera applies for registration with the pan-tilt-zoom device control apparatus.

Step 1002: After the pan-tilt-zoom control apparatus completes registration, the pan-tilt-zoom control apparatus sends a registration response to the camera.

Step 1003: The pan-tilt-zoom device sends a keep-alive command to enable the camera to determine a control capability of the pan-tilt-zoom device, and the camera sends control capability information of the pan-tilt-zoom device to the pan-tilt-zoom device control apparatus to enable the pan-tilt-zoom device control apparatus to obtain the control capability of the pan-tilt-zoom device.

Step 1004: The pan-tilt-zoom device control apparatus performs identifier processing on a type of the camera, that is, adds an identifier indicating that the camera has a corresponding pan-tilt-zoom control capability.

Step 1005: A monitoring client sends a camera pan-tilt-zoom control request to the pan-tilt-zoom device control apparatus.

Step 1006: The pan-tilt-zoom device control apparatus obtains an identifier, where the identifier indicates the pan-tilt-zoom control capability which the camera has.

Step 1007: The pan-tilt-zoom device control apparatus sends a pan-tilt-zoom control command to the camera, where the corresponding pan-tilt-zoom control command includes rotation direction control, windshield wiper control, lighting control, and the like.

Step 1008: After normally controlling the pan-tilt-zoom device through interaction, the camera returns a response to the pan-tilt-zoom device control apparatus, so as to complete an interaction process.

Step 1009: After sending the keep-alive command for the first time, the pan-tilt-zoom device sends the keep-alive command to the camera once every predetermined period of time, and if the camera does not receive, for a predetermined period of time, the keep-alive command sent by the pan-tilt-zoom device, the camera confirms that the pan-tilt-zoom device is faulty.

Step 1010: The camera sends fault information of the pan-tilt-zoom device to a pan-tilt-zoom device control apparatus.

Step 1011: The pan-tilt-zoom device control apparatus performs identifier processing on the camera, that is, adds an identifier indicating that the camera loses the pan-tilt-zoom device control capability and becomes an ordinary fixed camera.

Step 1012: The pan-tilt-zoom device control apparatus reports a notification to the monitoring client, and a user may find, in time by using the monitoring client, that the camera and the pan-tilt-zoom device are abnormal.

According to the technical solution of this embodiment, a camera determines, according to a keep-alive command, that a pan-tilt-zoom device connects to the camera and whether the pan-tilt-zoom device is available, and an information exchange procedure for notifying that the pan-tilt-zoom device connects to the camera is added for the camera and a management platform, which is convenient for the management platform and the camera to find a configuration problem by using capabilities of the management platform and the camera, thereby reducing a workload, lowering an error probability, and improving maintenance real-time performance.

The foregoing descriptions are merely exemplary specific implementation manners of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A pan-tilt-zoom device identification method, comprising:
   sending a keep-alive command to a connecting device when a pan-tilt-zoom device finds that the connecting device connects to a predetermined interface, wherein the keep-alive command comprises pan-tilt-zoom device capability information carrying a control fu on of the pan-tilt-zoom device;
   determining, by the connecting device, the control function of the pan-tilt-zoom device according to the keep-alive command; and
   reporting control capability information of the pan-tilt-zoom device.

2. The method according to claim 1, Wherein the method further comprises sending, by the pan-tilt-zoom device, the keep-alive command to the connecting device after a predetermined time interval.

3. The method according to claim 1, wherein the method further comprises:
   determining that the pan-tilt-zoom device is faulty when the connecting device does not receive the keep-alive command after a predetermined time interval; and
   reporting fault information of the pan-tilt-zoom device.

4. A pan-tilt-zoom device, comprising:
   an installation platform;
   a rotating motor; and
   a rotation control module,
   wherein both the rotating motor and the rotation control module are disposed on the installation platform, and a control signal output end of the rotation control module is connected to a control signal input end of the rotating motor,and
   wherein the pan-tilt-zoom device is configured to send a keep-alive command to a connecting device when it is found that the connecting device connects to a predetermined interface, wherein the keep-alive command comprises pan-tilt-zoom device capability information.

5. The pan-tilt-zoom device according to claim 4, wherein the pan-tilt-zoom device is configured to send the keep-alive command to the connecting device after a predetermined time interval.

6. A camera, comprising:
   a lens;
   a sensor;
   a coding processor; and
   a main controller,
   wherein image signal output ends of the lens and the sensor are connected to an image signal input end of the coding processor, an image signal output end of the coding processor is connected to an image signal input end of the main controller, and a control signal output end of the main controller is connected to a control signal input end of the coding processor, and
   wherein the camera is configured to:
     determine a control function of a pan-tilt-zoom device according to a keep-alive command, wherein the keep-alive command comprises pan-tilt-zoom device capability information; and
     report control capability information of the pan-tilt-zoom device.

7. The camera according o claim 6, wherein the camera further is configured to determine that the pan-tilt-zoom device is faulty when the keep-alive command is not received after a predetermined time interval.

8. The camera according to claim 7, wherein the camera is configured to report fault information of the pan-tilt-zoom device.

9. A pan-tilt-zoom device control system, comprising:
   a pan-tilt-zoom device comprising an installation platform, a rotating motor, and a rotation control module, wherein both the rotating motor and the rotation control module are disposed on the installation platform, and a control signal output end of the rotation control module is connected to a control signal input end of the rotating motor, wherein the pan-tilt-zoom device is configured to send a keep-alive command to a connecting device when it is found that the connecting device connects to a predetermined interface, wherein the keep-alive command comprises pan-tilt-zoom device capability information;

a camera comprising a lens, a sensor, a coding processor, and a main controller, wherein image signal output ends of the lens and the sensor are connected to an image signal input end of the coding processor, an image signal output end of the coding processor is connected to an image signal input end of the main controller, and a control signal output end of the main controller is connected to a control signal input end of the coding processor, wherein the camera is configured to determine a control function of a pan-tilt-zoom device according to a keep-alive command, wherein the keep-alive command comprises pan-tilt-zoom device capability information, and wherein the camera is further configured to report control capability information of the pan-tilt-zoom device; and a pan-tilt-zoom device control apparatus, wherein the pan-tilt-zoom device control apparatus is configured to:

send a corresponding pan-tilt-zoom control command according to control capability information of the connecting pan-tilt-zoom device; and confirm, according to fault information of the connecting pan-tilt-zoom device, that the pan-tilt-zoom device is fault.

10. The pan-tilt-zoom device control system according to claim 9, wherein the camera is configured to report a control response of the pan-tilt-zoom device after the pan-tilt-zoom control command is sent to the pan-tilt-zoom device.

11. The pan-tilt-zoom device control system according to claim 9, wherein the pan-tilt-zoom device is configured to send the keep-alive command to the connecting device after a predetermined time interval.

12. The pan-tilt-zoom device control system according to claim 9, wherein the camera is configured to determine that the pan-tilt-zoom device is faulty when the keep-alive command is not received after a predetermined time interval.

13. The pan-tilt-zoom device control system according to claim 12, wherein the camera is configured to report fault information of the pan-tilt-zoom device.

* * * * *

UNITED STATES PATENT AND TRADEMARK OFFICE
CERTIFICATE OF CORRECTION

PATENT NO. : 9,509,895 B2  
APPLICATION NO. : 14/580868  
DATED : November 29, 2016  
INVENTOR(S) : Zhiquan Yang and Yongjin Cai It is certified that error appears in the above-identified patent and that said Letters Patent is hereby corrected as shown below:

In the Claims

Column 10, Line 3, Claim 2 should read:
The method according to claim 1, wherein the method further comprises sending, by the pan-tilt-zoom device, the keep-alive command to the connecting device after a predetermined time interval.

Column 10, Line 22, Claim 4 should read:
A pan-tilt-zoom device, comprising:
    an installation platform;
    a rotating motor; and
    a rotation control module,
    wherein both the rotating motor and the rotation control module are disposed on the installation platform, and a control signal output end of the rotation control module is connected to a control signal input end of the rotating motor, and
    wherein the pan-tilt-zoom device is configured to send a keep-alive command to a connecting device when it is found that the connecting device connects to a predetermined interface, wherein the keep-alive command comprises pan-tilt-zoom device capability information.

Column 10, Line 51, Claim 7 should read:
The camera according to claim 6, wherein the camera further is configured to determine that the pan-tilt-zoom device is faulty when the keep-alive command is not received after a predetermined time interval.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*